United States Patent
Yamamoto et al.

(10) Patent No.: US 7,463,237 B2
(45) Date of Patent: Dec. 9, 2008

(54) CONTROLLER CIRCUIT OF IMAGE DISPLAY DEVICE, DISPLAY DEVICE, AND PROGRAM AND RECORDING MEDIUM THEREOF

(75) Inventors: Tomohiko Yamamoto, Nara (JP); Kohji Fujiwara, Tenri (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 551 days.

(21) Appl. No.: 11/082,021

(22) Filed: Mar. 17, 2005

(65) Prior Publication Data

US 2005/0206609 A1  Sep. 22, 2005

(30) Foreign Application Priority Data

Mar. 19, 2004  (JP) ............................. 2004-081548

(51) Int. Cl.
*G09G 3/36* (2006.01)
(52) U.S. Cl. ........................................ 345/104; 345/211
(58) Field of Classification Search ........... 345/87–104, 345/204, 211, 1.1; 361/681; 700/83
See application file for complete search history.

(56) References Cited

U.S. PATENT DOCUMENTS

| | | | |
|---|---|---|---|
| 5,703,658 A | 12/1997 | Tsuru et al. | |
| 5,771,031 A | 6/1998 | Kinoshita et al. | |
| 5,880,703 A * | 3/1999 | Hashimoto | 345/2.1 |
| 5,986,716 A | 11/1999 | Sokawa et al. | |
| 6,025,840 A | 2/2000 | Taylor | |
| 6,380,983 B1 | 4/2002 | Miyazaki | |
| 6,867,749 B1 * | 3/2005 | II et al. | 345/1.1 |
| 7,203,516 B2 * | 4/2007 | Kim | 455/556.1 |
| 7,224,323 B2 | 5/2007 | Uchida et al. | |
| 2002/0054028 A1 | 5/2002 | Uchida et al. | |
| 2003/0145334 A1 | 7/2003 | Motoe et al. | |
| 2004/0119706 A1 * | 6/2004 | Sekiguchi et al. | 345/204 |
| 2004/0246261 A1 * | 12/2004 | Akitsune et al. | 345/581 |
| 2005/0183135 A1 | 8/2005 | Uchida et al. | |
| 2005/0188401 A1 | 8/2005 | Uchida et al. | |
| 2005/0188417 A1 | 8/2005 | Uchida et al. | |
| 2005/0188418 A1 | 8/2005 | Uchida et al. | |

(Continued)

FOREIGN PATENT DOCUMENTS

EP  1 160 673 A1  12/2001

(Continued)

*Primary Examiner*—Nitin Patel
(74) *Attorney, Agent, or Firm*—Birch, Stewart, Kolasch & Birch, LLP

(57) ABSTRACT

A programmable logic IC and a ROM are set in a controller section between a display and ICs (an IC for wireless communication and an IF IC). In each of plural program sets stored in the ROM, a series of operation up to the time that image data, after being read from the IC for wireless communication and converted into a logic signal, is sent to the display is described. On the other hand, the programmable logic IC changes the program set being read, according to what is displayed on the display, television images, a monitor image supplied from a computer, or image data from a memory card. This makes it possible to attain an image-display-device controller circuit that has a small circuit scale, consumes a small amount of power, and is small in size and weight are small, but can change operation.

14 Claims, 6 Drawing Sheets

U.S. PATENT DOCUMENTS

| | | | |
|---|---|---|---|
| 2006/0192683 A1* | 8/2006 | Blum et al. | 340/691.6 |
| 2007/0008302 A1 | 1/2007 | Uchida et al. | |

FOREIGN PATENT DOCUMENTS

| | | |
|---|---|---|
| JP | 8-211846 | 8/1996 |
| JP | 8-340497 A | 12/1996 |
| JP | 9-247573 A | 9/1997 |
| JP | 10-257407 A | 9/1998 |
| JP | 2000-148113 A | 5/2000 |
| JP | 2000-305542 A | 11/2000 |
| JP | 2002-32069 A | 1/2002 |
| JP | 2002-34023 A | 1/2002 |
| JP | 2003-179773 A | 6/2003 |
| JP | 2003-224739 A | 8/2003 |

* cited by examiner

CONTROLLER CIRCUIT OF IMAGE DISPLAY DEVICE, DISPLAY DEVICE, AND PROGRAM AND RECORDING MEDIUM THEREOF

This Nonprovisional application claims priority under 35 U.S.C. § 1.19(a) on Patent Application No. 81548/2004 filed in Japan on Mar. 19, 2004, the entire contents of which are hereby incorporated by reference.

FIELD OF THE INVENTION

The present invention relates to a controller circuit for controlling an image display device, a display device including the circuit, and a program and a recording medium thereof. In particular, the present invention relates to (i) an image-display-device controller circuit (controller circuit for an image display device) which is small in circuit scale, power consumption, size and weight although the circuit can change a series of operation from receiving data from an interface circuit to outputting a controller signal for controlling the image display device, (ii) a display device including the circuit, (iii) a program and (iv) a recording medium thereof.

BACKGROUND OF THE INVENTION

Various kinds of image display devices including a liquid crystal display device have so far been used widely. A controller circuit for controlling the image display device also has been widely used. Types of images that can be displayed on the image display device and types of protocols for transmitting a signal to the image display device has increased along with development of computer technology and communication technology. The image display device is required to display various kinds of images, for example, television images and a monitor image of a computer, image data taken by a digital camera and recorded in a recording medium, and the like. As a protocol for a wireless LAN (local area network), various types of protocols such as IEEE (Institute of Electrical and Electronic Engineers) 802.11a, 802.11b, 802.11g, 802.11e, Bluetooth (Registered Trademark) and the like are used.

In a patent document 1 (Tokukai 2001-223760 published on Aug. 17, 2001; and corresponding EP 1,160,673), a configuration, wherein a wireless communication device for processing a communication protocol processes these communication protocols by a CPU (Central Processing Unit), is disclosed. In a patent document 2 (U.S. Pat. No. 6,025,840; International Publication published on Apr. 17, 1997; and corresponding Japanese PCT Laid-Open Publication 510068/1998 (Tokuhyohei No. 10-510068) published on Sep. 29, 1998), a configuration that plural display sub-systems are provided in a display controller system and each display sub-system controls reproduction of an image in corresponding area on a display screen of a display device is disclosed.

However, when the conventional configuration is applied to an image display device displaying plural types of images or images transmitted by plural types of protocols, a following problem occurs. Namely, when a CPU is caused to carry out processing of communication protocols or image display as in a manner described in the patent document 1, the CPU carries out the processing by repeating the process. Because of this, the CPU whose processing speed is relatively high becomes necessary, and circuit scale, power consumption, size and weight of the device tend to increase.

In a configuration in which a circuit for each kind of communication protocols and images is provided separately as described in the patent document 2, circuit scale, power consumption, size and weight of the display device tend to increase as the kinds of communication protocols and images increase.

SUMMARY OF THE INVENTION

The purpose of the present invention is to provide (i) an image-display-device controller circuit which is small in circuit scale, power consumption, size and although the circuit can change a series of operation from receiving data from an interface circuit to outputting a controller signal for controlling the image display device, (ii) a display device including the circuit, and (iii) a program and a recording medium thereof.

In order to accomplish the purpose above, an image-display-device controller circuit according to the present invention is characterized by including a programmable logic circuit, which is connected between (a) an interface circuit for inputting data indicating content to be displayed on an image display device and (b) the image display device, for controlling the image display device to display an image that corresponds to the data from the interface circuit and a storage device that stores plural program sets each of which describing a series of processes from (i) receiving data from the interface circuit to (ii) outputting a controlling signal for controlling the image display device, for programming the programmable logic circuit. The programmable logic circuit (A) reads one of the plural program sets stored in said storage device and operates in accordance with the one of the plural program sets, and (B) when operation described in another one of the plural program sets becomes necessary, reads the another one of the plural program sets from the storage device and operates in accordance with the another one of the plural program sets, so as to change its operation.

In the configuration mentioned above, the programmable logic circuit programmed by one of the plural program sets carries out the series of processes from (i) receiving data from the interface circuit to (ii) outputting a controlling signal for controlling the image display device.

In this state, for example, when operation described in another one of plural program sets becomes necessary in order (i) to display a different kind of content from content that the image display device is displaying, (ii) to display content according to a different protocol from a protocol according to which the image display device is displaying content, and (iii) to display content according to a different kind of application from a kind of application according to which the image display device is displaying content or the like, said programmable logic circuit reads, from said storage device, that one of the plural program sets. This changes operation of the programmable logic circuit.

In the configuration above, by changing the program set for programming the programmable logic circuit according to circumstances, operation of the programmable logic circuit is changed. Therefore, different from a configuration in which a necessary circuit for each circumstance is separately provided, the programmable logic circuit is shared as a circuit necessary for each circumstance. As the result, circuit scale, power consumption, size and weight can be drastically reduced, compared with the configuration in which circuits are provided separately for each circumstance.

Moreover each operation mentioned above is carried out by the programmable logic circuit (a circuit that can change connection between logic circuits by rewriting the program).

Therefore, compared with a configuration in which the above operation is carried out by including a general-purpose high-speed CPU and a main storage device and making the CPU repeat processing, circuit scale, power consumption, size and weight can be drastically reduced.

Because the above operation is a series of operation from (i) receiving data from the interface circuit to (ii) outputting a controlling signal for controlling the image display device, the operation can be carried out, without any troubles, by the programmable logic circuit.

For a fuller understanding of the nature and advantages of the invention, reference should be made to the ensuing detailed description taken in conjunction with the accompanying drawings.

DESCRIPTION OF THE EMBODIMENTS

Figure 1:
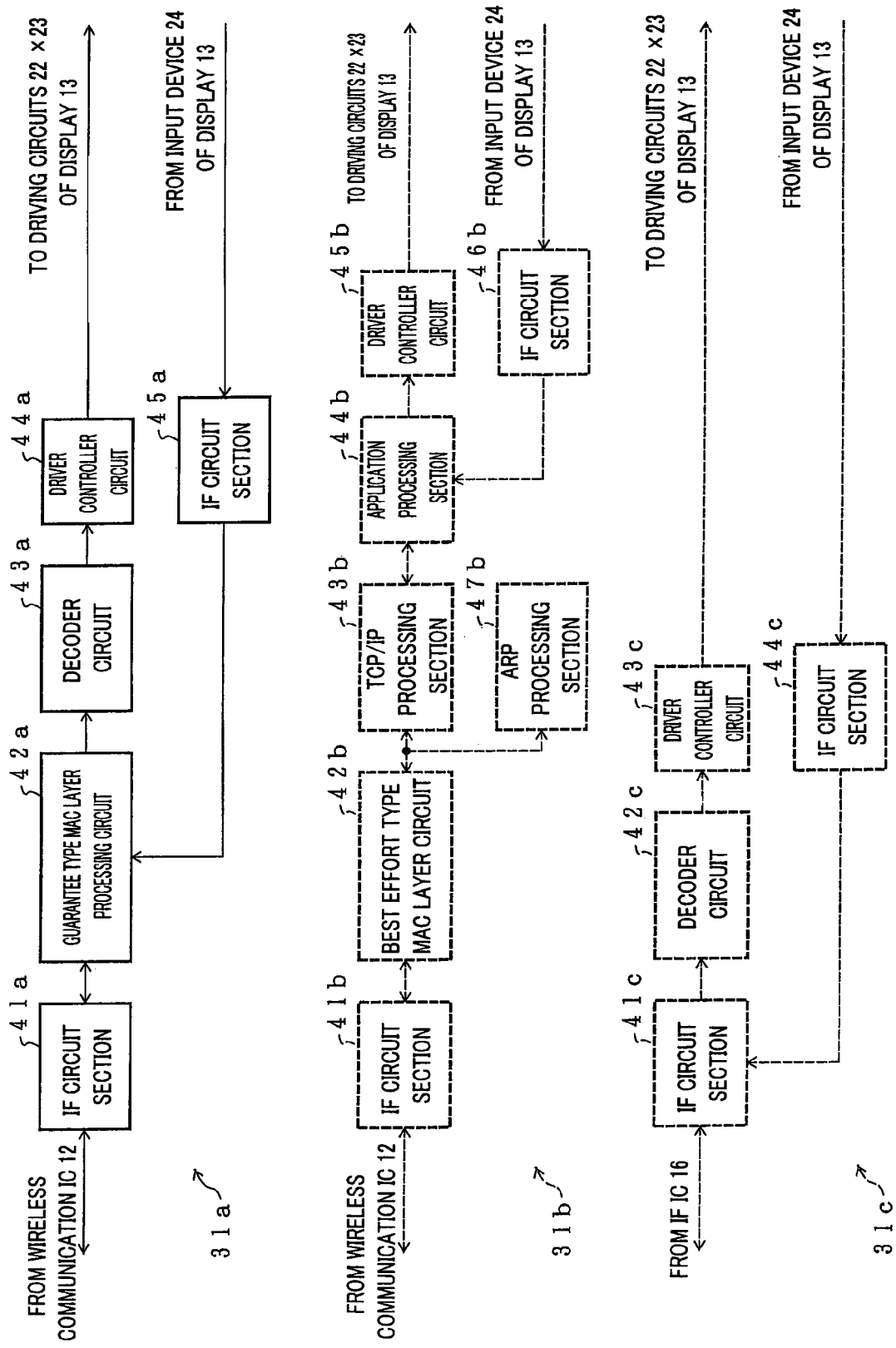
FIG. 1 is a block diagram of a function block realized, by each program set, as a programmable logic IC (Integrated Circuit) included in a display terminal according to an embodiment of the present invention.

An embodiment of the present invention is explained referring to FIGS. 1 to 6 as follows. Namely, as illustrated in FIG. 2, a network system 1 concerning the present embodiment is a system in which a television image and a monitor image can be seen at a place remote from a receiver of the television broadcast and a main body of the computer. The network system 1 includes a receiver body 2 that receives television broadcast and a computer 3 that includes, for example, a personal computer and the like and a display terminal (display device) 4 that is capable of communicating with both devices 2 and 3 via a wireless transmission path.

When the devices 2 and 3 can communicate with the display terminal 4, for example, the devices 2 and 3 may be connected with each other by a wired local area network (LAN) and the devices 2 and 3 may communicate with the display device 4 via a router connected to the LAN. The following, however, is an explanation of an exemplary case in which each of the devices 2 and 3 has a wireless communication capability and the devices 2 and 3 can directly communicate with the display terminal 4 according to a predetermined standard such as IEEE 802.11b.

The receiver body 2 receives television broadcast of a desired channel by, for example, an antenna. Also, the receiver body 2 can encode the television broadcast to a predetermined screen image format (for example, MPEG (Moving Picture Expert Group) 2 and the like) and transmit video data in accordance with the format to the display terminal 4, according to a predetermined standard of wireless communication. This makes it possible to display television images of a selected station though the display terminal 4 is set up at a place remote from the receiver body 2.

The receiver body 2 in this embodiment of the present invention adopts IEEE 802.11b for a physical layer of wireless communication. The receiver body 2 of this embodiment also adopts a guarantee type MAC (Media Access Control) protocol as a media access control (MAC) system of a data link layer.

In this embodiment, as one example of the guarantee type MAC protocol, IEEE 802.11e is adopted. According to the IEEE 802.11e, during the time that a device is communicating using a communication channel (to be more precise, all the time during which connection between the device and a communication counterpart is established; in the reality, all the time during which the display terminal 4 displays television images supplied from the receiver body 2), the communication channel is kept occupied. Accordingly, while other devices cannot communicate using the communication channel, the device occupying the communication channel for the present can transmit video data more efficiently than when the communication channel is shared with another device. As the result, for example, even when IEEE802.11b is adopted for the physical layer and transmitted data is video data encoded by MPEG2, the receiver body 2 can continue transmitting video data to the display terminal 4 having no troubles such as frame dropping.

As the guarantee type MAC protocol mentioned above, an independent protocol that is not conformed to an IEEE standard may be used. As an example of such a guarantee type MAC protocol, it is ascertained that the receiver body can operate with, for example, a MAC protocol called SS700 that is developed by SHARP Corporation and commercialized. In this way, using an independent MAC protocol that is not conformed to the IEEE standard, it is possible to prevent video contents from being transmitted through a personal computer. Thus, in the view of copyright protection, using such a MAC protocol is preferable.

When the receiver body 2 in this embodiment transmits the video data mentioned above, the video data is directly passed to a MAC layer, without providing a network layer and a transport layer (for example, TCP/IP: Transmission Control Protocol/Internet Protocol) above the MAC layer. Here, as mentioned above, in the network system 1 the receiver body 2 and the display terminal 4 communicate directly with each other and the receiver body 2 adopts the guarantee type MAC protocol. Accordingly, although a network layer and a transport layer are not provided, the receiver body 2 can transmit video data to the display terminal 4 without any troubles. Accompanying this, processing at the receiver body 2 and the display terminal 4 is simplified.

Moreover, when the receiver body 2 receives operating data that indicates receiving of an instruction such as selecting a station and the like, a processing corresponding to the operation that is indicated by the operating data (for example, selecting a station) can be carried out.

The computer 3 can operate as a server of a remote desktop system. A monitor image of the computer 3 can be displayed on the display terminal 4 by transmitting the monitor image itself displayed on a display of the computer 3 (not illustrated in the FIGS.) or by transmitting a virtual monitor image to the display terminal 4 as a client device. Moreover, for example, the computer 3 receives operating data, such as positional information inputted by a pointing device, character information inputted by a keyboard and the like, that indicates an input operation from the display terminal 4 and, based on the operating data, it is possible to carry out the same processing as the case in which an input device such as the keyboard, the pointing device and the like are connected to the computer 3.

As the result, the display terminal 4 is capable of displaying the monitor image of the computer 3 to a user in the same manner as a display connected to the computer 3 by wiring even though it is possible to place the display terminal 4 remote from the computer 3. At the same time, the display terminal 4 can receive user's instruction and transmit it to the computer 3 in the same way as an input device (not illustrated in FIGS.) connected to the computer 3 by wire.

The computer 3 in this embodiment adopts IEEE 802.11b for a physical layer of wireless communication and the receiver body 2 in this embodiment adopts a best effort type MAC protocol as a media access control (MAC) system of a data link layer.

In this embodiment, IEEE 802.11 is adopted as one example of the best effort type MAC protocol. The IEEE 802.11 is arranged so that, in a case where a device transmits/receives a packet using a communication channel, the communication channel is handed over at a predetermined timing (for example, every time each packet communication ends) if no packet for transmission/reception exists during the time that a connection between the device and a party of the communication is being established. Accordingly, being different from the configuration in which the channel is occupied as mentioned above, even when plural devices that are capable of wireless communication exist in the network system 1, communication of another device is not blocked. Thus, the communication channel can be shared among these plural devices. Even in this case, compared with video data that indicates television images, real-time display of a monitor image is barely necessary. Therefore, the computer 3 can display the monitor image on the display terminal 4 without any troubles.

A remote desktop system server (not illustrated in FIGS.) that operates on the computer 3 in this embodiment is arranged so that communication is carried out by TCP/IP. Accompanying this, the computer 3 in this embodiment has a TCP/IP layer as a network layer and a transport layer, provided on the data link layer (MAC layer/LLC layer). When the TCP/IP layer receives a data stream of a protocol for the remote desktop system from the server, the layer adds data for transmission using a TCP/IP protocol, for example, a header of the TCP/IP protocol and the like, to the data stream. Then the layer generates a data stream of a TCP/IP protocol format and gives an instruction to send the data stream to the data link layer. In the same manner, when the TCP/IP layer receives a data stream of an IP protocol format from the data link layer, the TCP/IP layer removes data for transmission using the TCP/IP protocol from the data stream, generates a data stream of the protocol for the remote desktop system, and passes the data stream to the server.

For example, in this embodiment, a VNC (Virtual Network Computing) protocol is adopted as the protocol for the remote desktop system. The server can transmit a part or all of the monitor image to the display terminal 4 that is a client and at the same time can synchronize the operation of operating data by the client with the operation of the monitor image.

Figure 3:
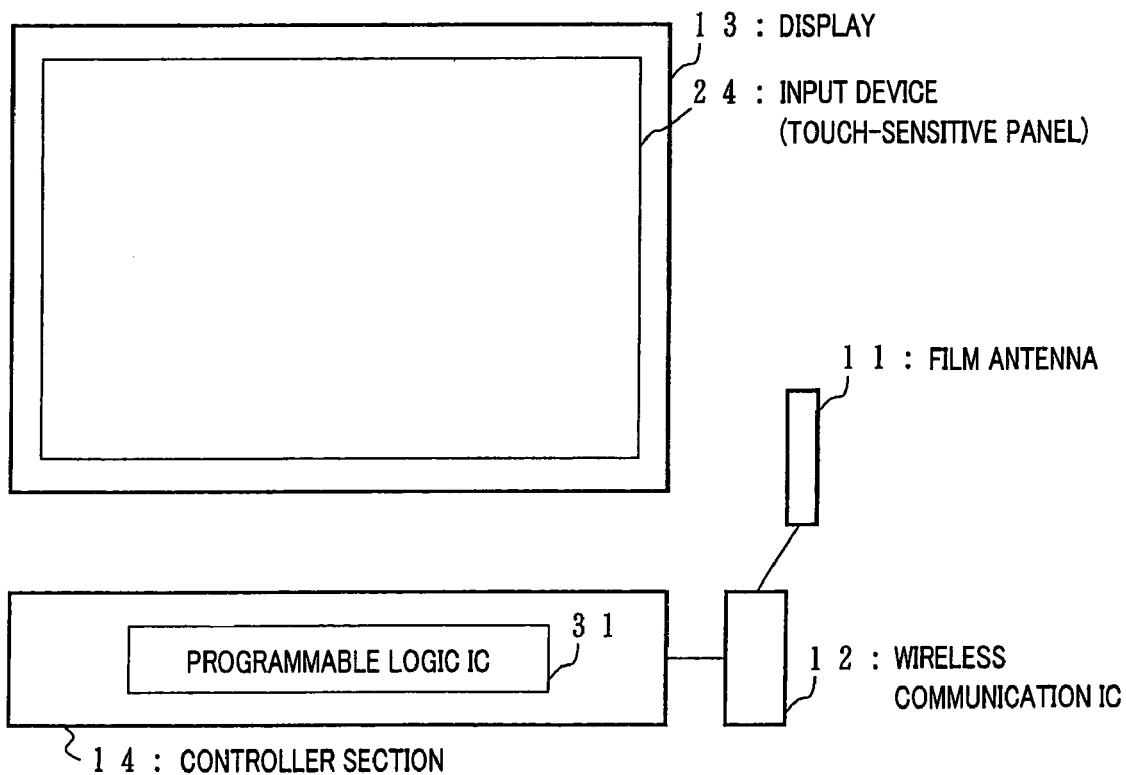
FIG. 3 is a drawing schematically illustrating a state before the display terminal mentioned above is assembled.

On the other hand, as illustrated in FIG. 3, the display terminal 4 in this embodiment includes a film antenna 11 as an antenna for carrying out wireless communication, a wireless communication IC (Integrated Circuit) 12 (IC for wireless communication) that is connected to the film antenna 11 and carries out modulation and demodulation from a baseband signal to a radio signal or from a radio signal to a baseband signal, a display device (an image display device) 13 that includes, for example, a liquid crystal panel and the like, and a controller section (an image-display-device controller circuit) 14 that is set between the wireless communication IC 12 and the display device 13 and is capable of controlling the display 13 so that an image instructed to be displayed via the wireless communication IC 12 is displayed. Note that the wireless communication IC 12 and an interface circuit IC 16 (IC for an interface circuit) mentioned later corresponds to the interface circuit described in claims.

Figure 4:
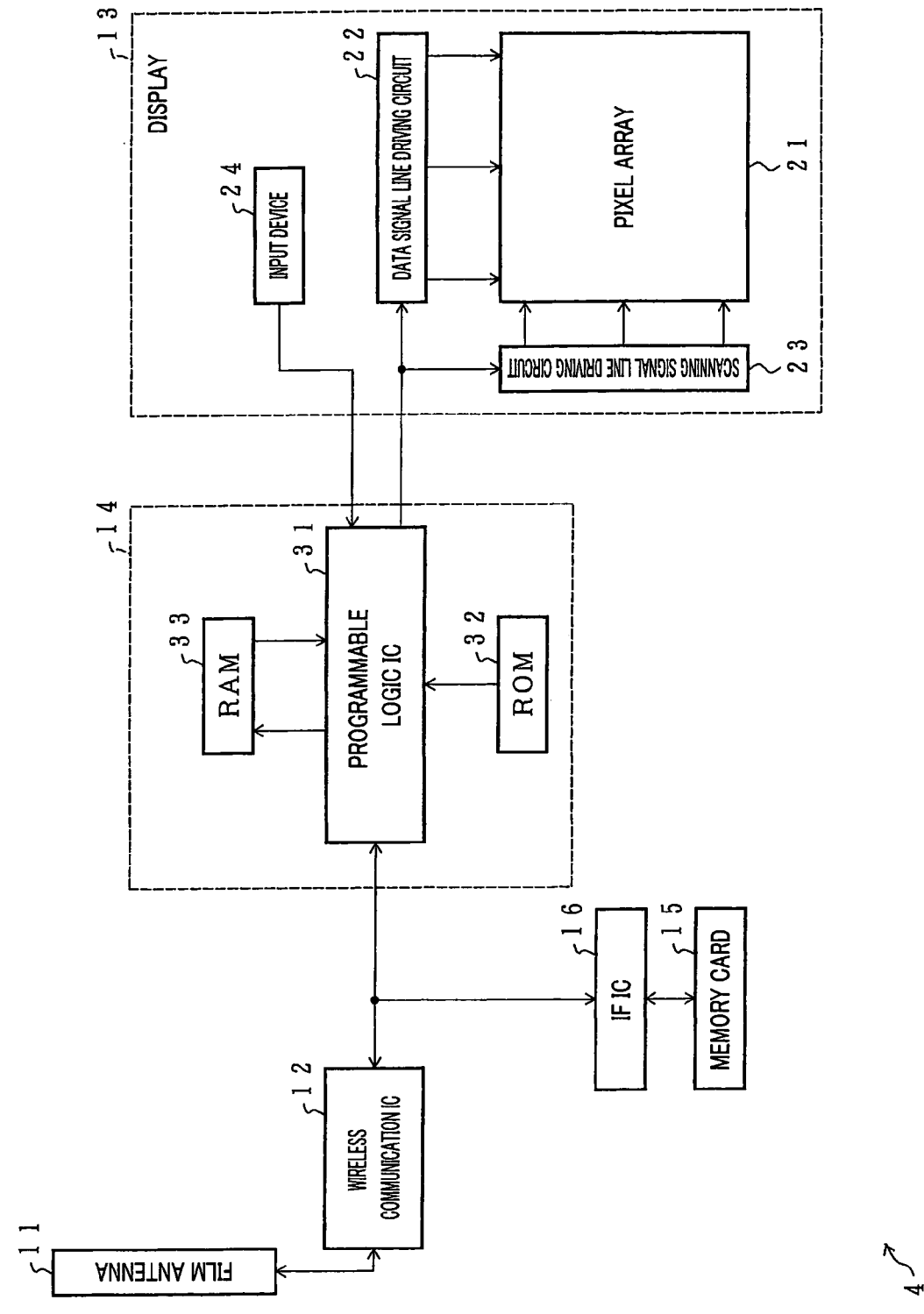
FIG. 4 is a block diagram of a substantial configuration of the display terminal mentioned above.
Figure 5:
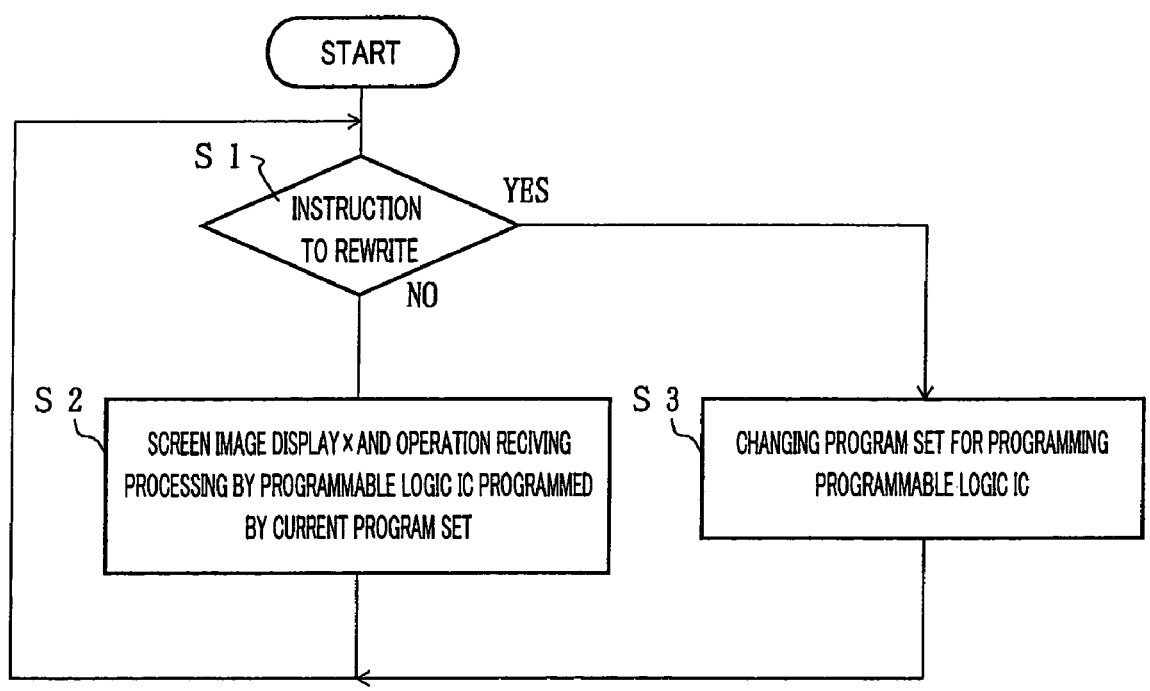
FIG. 5 is a flow chart illustrating operation of the display terminal mentioned above.

The display 13 in this embodiment, for example, is attained by a liquid crystal device and includes, as illustrated in FIG. 4, a pixel array 21 that includes pixels arranged in a matrix, a data signal line driving circuit 22 that drives data signal lines of the pixel array 21 and a scanning signal line driving circuit 23 that drives scanning signal lines of the pixel array 21. The pixel array 21 includes plural data signal lines and plural scanning signal lines that intersect each data signal line respectively, and a pixel is provided for every combination of a data signal line and a scanning signal line. Note that these driving circuits 22 and 23 correspond to the driving circuit described in claims.

Here, the scanning signal line driving circuit 23 outputs, to each scanning signal line, a signal, for example, a voltage signal and the like, that indicates whether a line is in a selected period or not. The scanning signal line driving circuit 23 changes a scanning signal line to which the signal that indicates a selected period is outputted based on a timing signal provided from outside. By this operation, each scanning signal line is selected in turn at predetermined timing.

Moreover, the data signal line driving circuit 22 respectively extracts video data, that is inputted to each pixel by time sharing, by, for instance, taking a sample at predetermined timing. Furthermore, the data signal line driving circuit 22 outputs, to each pixel corresponding to a scanning signal line that is being selected by the scanning signal line driving circuit 23, an output signal corresponding to video data to each pixel via a data signal line corresponding to the pixel.

On the other hand, each pixel determines the brightness of the pixel by adjusting luminance at light emission and transmittance, according to an output signal provided to a data signal line corresponding to the pixel during the time that a scanning signal line corresponding to the pixel is being selected.

Here, the scanning signal line driving circuit 23 serially selects the scanning signal lines. Accordingly, all the pixels of the pixel array 21 can respectively have brightness (gray scale level) indicated by each video data and an image displayed on the pixel array 21 can be updated.

The display 13 of this embodiment does not include a timing controller that controls the data signal line driving circuit 22 and the scanning signal line driving circuit 23 of the display 13. Both the driving circuits 22 and 23 are directly connected to the controller section 14 (i.e. not by way of the timing controller).

On the other hand, the controller section 14 of this embodiment includes a programmable logic IC 31 including a programmable logic circuit and a ROM (Read Only Memory) 32 as a memory (a memory circuit) in which a program of the programmable logic IC 31 is stored. Plural program sets are stored in the ROM 32 and the programmable logic IC 31 can choose which of the plural program sets is used for programming the logic circuits of the IC. Note that the programmable logic IC 31 corresponds to the programmable logic circuit described in claims.

Moreover, the controller section 14 in this embodiment includes a RAM (Random Access Memory) 33 as a work memory. The programmable logic IC 31 writes, into the RAM 33, video data that indicates a gray scale level of each pixel (data that indicates a video image at least for a frame) in the display 13 based on the instruction from the wireless communication IC 12. At the same time, the programmable logic IC 31 sequentially reads out the video data from the RAM 33 and outputs the video data to the display 13 (to be more specific, to the data signal line driving circuit 22), as a video signal.

In this embodiment, as mentioned above, the display 13 leaves out a timing controller. Accompanying this, the programmable logic IC 31 of this embodiment supplies not only a video signal to the data signal line driving circuit 22 but also a controller signal including the timing signal to the data signal line driving circuit 22 and the scanning signal line driving circuit 23 in the display 13, so as to control the operating timing of both the driving circuits 22 and 23.

To explain the programmable logic IC 31 and plural program sets more specifically, the programmable logic IC 31 in this embodiment includes, for example, a combination logic circuit and a sequence logic circuit as logic circuits. The connection between these logic circuits can be changed according to the program sets. In this embodiment, FPGA (Field Programmable Gate Array) is adopted as a programmable logic IC 31, but other programmable logic circuits, for example, PAL (Programmable Array Logic), PLA (Programmable Logic Array) and the like, can be suitably used, on condition that the circuit includes a programmable logic circuit.

In the ROM 32 in this embodiment, a program set Pa, that is used when television images transmitted from the receiver body 2 are displayed, and a program set Pb, that is used when a monitor image of the computer 3 is displayed, are stored as the plural program sets.

When television images are displayed on the display 13, the programmable logic IC 31 connects logic circuits of the programmable logic IC 31 according to the program set Pa. This forms each block from 41a to 43a as illustrated in FIG. 1 in the programmable logic IC 31 and allows the programmable logic IC 31 to operate as a programmable logic IC 31a.

To be more precise, the programmable IC 31a includes an interface (IF) circuit section 41a, a guarantee type MAC layer processing circuit 42a, a decoder circuit 43a, and a driver controller circuit 44a. The IF circuit section 41a is used for communicating with the wireless communication IC 12. The guarantee type MAC layer processing circuit 42a converts a digital signal stream supplied from the wireless communication IC 12 via the IF circuit section 41a into a data stream of a predetermined video format after analyzing the received digital signal stream according to a predetermined guarantee type MAC protocol. The decoder circuit 43a analyzes (decodes) the data stream and writes video data that indicates an image of each frame into the RAM 33. The driver controller circuit 44a controls operation of the data signal line driving circuit 22 and the scanning signal line driving circuit 23 in the display 13 and transmits video data stored in the RAM 33 to the data signal line driving circuit 22.

Figure 2:
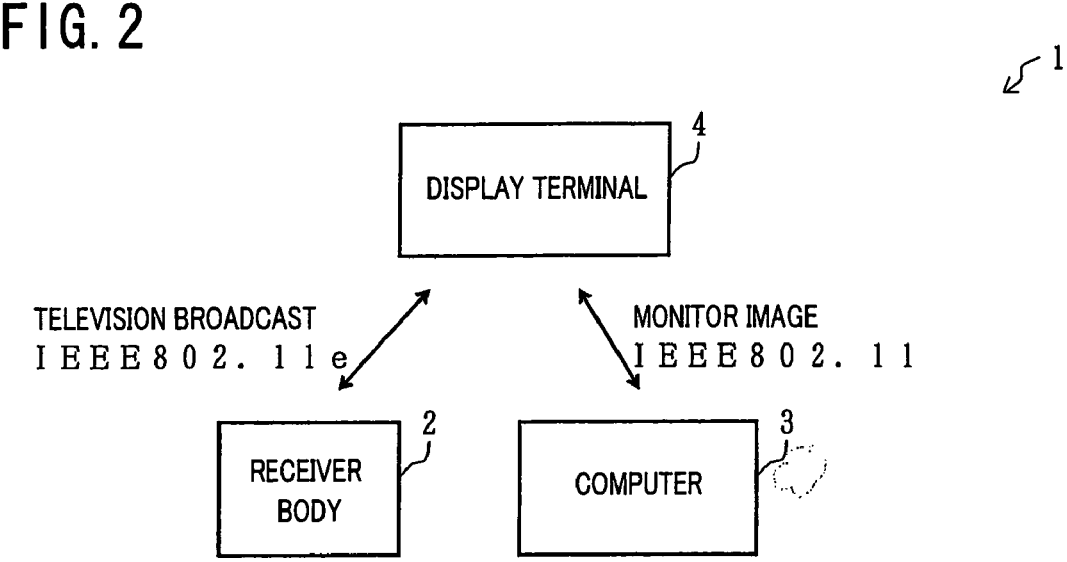
FIG. 2 is a system configuration diagram of a substantial configuration in a network system including the display terminal mentioned above.
Figure 6:
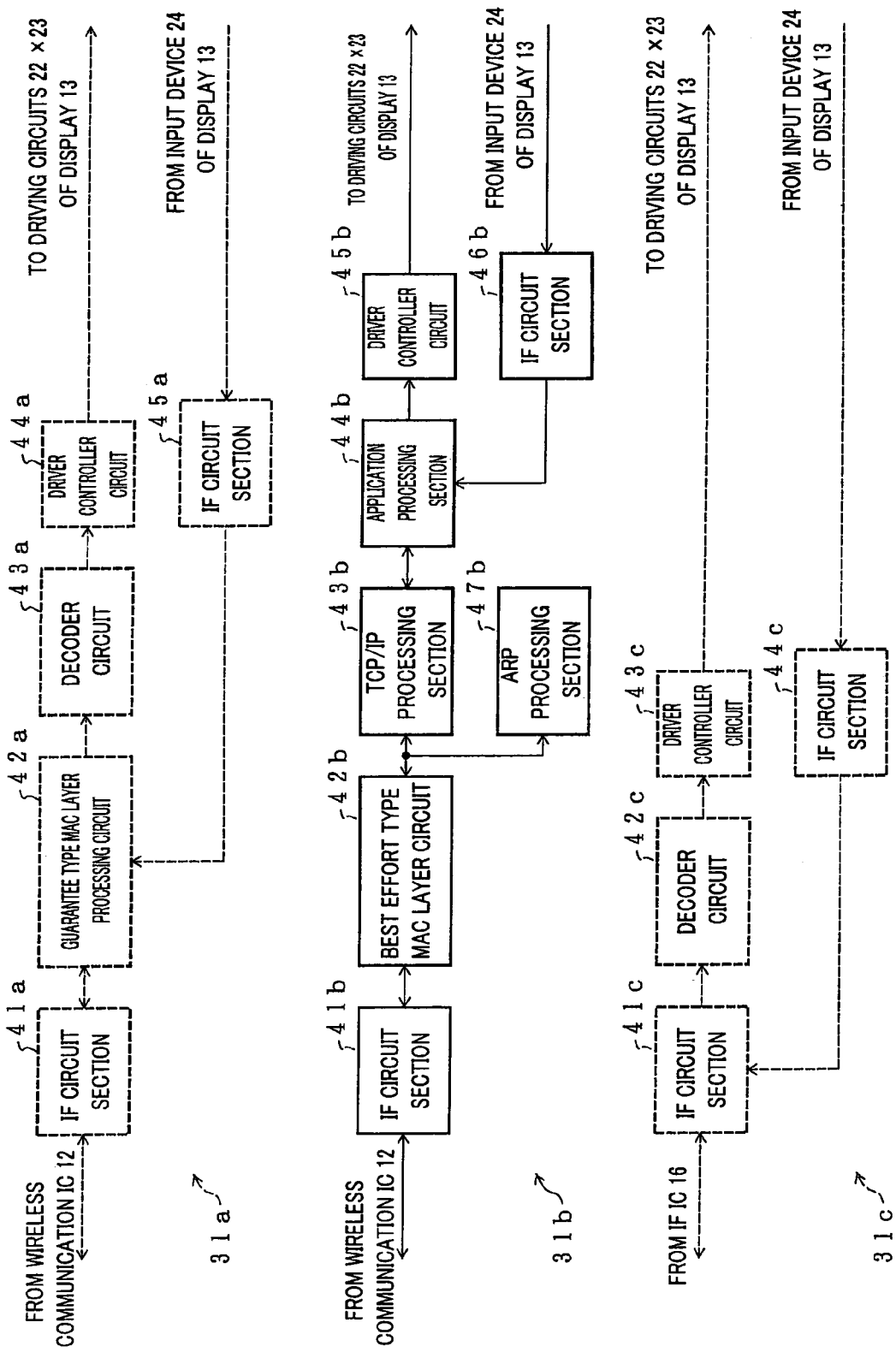
FIG. 6 is a block diagram of a function block realized in the programmable logic IC mentioned above and at the same time the block diagram illustrates a state at which a monitor image of a computer included in a network system is displayed.

In FIG. 1 and FIG. 6 explained later, for convenience of explanation, of blocks in the programmable logic IC 31, blocks currently established in the programmable logic IC 31 is illustrated by a solid line and blocks that can be formed in the programmable logic IC 31 but are not formed as connection of logic circuits according to a current program set is illustrated by a dotted line.

This allows the programmable logic IC 31 (31a) to control both the driving circuits 22 and 23 in the display 13 so that television images supplied from the wireless communication IC 12 by the receiver body 2 are displayed.

On the other hand, when the monitor image from the computer 3 is displayed, the programmable logic IC 31 connects the logic circuits of the IC according to the program set Pb. This forms each of blocks from 41b to 45b in the programmable logic IC 31 as illustrated in FIG. 1 and allows the programmable logic IC 31 to operate as a programmable logic IC 31b.

The programmable logic IC 31b includes an IF circuit section 41b, a best effort type MAC layer processing circuit 42b, a TCP/IP processing section 43b, an application processing section 44b, and a driver controller circuit 45b. The IF circuit section 41b is for communicating with the wireless communication IC 12. The best effort type MAC layer processing circuit 42b analyzes a digital signal stream supplied from the wireless communication IC 12 via the IF circuit section 41b, according to a predetermined best effort type MAC protocol, and converts the signal stream into a data stream of an IP protocol. The TCP/IP processing section 43b analyzes the data stream, removes data for transmission in a TCP/IC protocol, so as to restore the data stream of the protocol for the remote desktop system. The application processing section 44b analyzes the data stream according to the protocol and updates video data stored in the RAM 33 so as to cause the video data to indicate the monitor image indicated by the data stream. The driver controller circuit 45b controls operation of the data signal line driving circuit 22 and the scanning signal line driving circuit 23 in the display 13 and transmits the video data stored in the RAM 33 to the data signal line driving circuit 22.

For example, a data stream of the protocol for the remote desktop system includes not only a data stream that instructs rewriting of a whole monitor image but also, for example, a data stream that instructs rewriting of only a predetermined area of the monitor image transmitted. Accordingly, among logic circuits included in the application processing section 44b, logic circuits, that operate when a data stream that instructs rewriting of the whole screen is supplied, write the video data of the monitor image to the RAM 33, according to the supplied data stream. On the other hand, among logic circuits included in the application processing section 44b, logic circuits, which operate when a data stream that instructs rewriting of a part of the monitor image is received, rewrite, among sets of video data of the monitor image stored in the RAM 33, video data written in an address corresponding to area indicated by the supplied data stream so that the video data is caused to indicate the supplied data stream.

This allows the programmable logic IC 31 (31b) to control both the driving circuits 22 and 23 in the display 13 according to an instruction received by the wireless communication IC 12 and supplied from the computer 3, and to cause both the driving circuits 22 and 23 to display the monitor image on the pixel array 21.

The display terminal 4 in this embodiment can not only display television images and the monitor image but also receive operation concerning television broadcast (for example, an instruction to choose a station) and operation to the monitor image.

To be more specific, the display 13 in this embodiment includes, as illustrated in FIG. 4, an input device 24 that receives operation by a user of the display terminal 4. In this embodiment, as the input device 24, a touch-sensitive panel set on a screen of the display 13 is adopted so that the display terminal 4 is easily carried around.

On the other hand, in the programmable logic IC 31, an input signal that indicates whether or not operation is instructed and content of operation (for example, which coordinate is touched and the like) is inputted from the input device 24.

The program sets Pa and Pb are arranged so that the programmable logic IC 31 can give an instruction for transmitting a data stream corresponding to the input signal to the wireless communication IC 12.

To be more specific, the IF circuit section 45*a* that receives the input signal from the input device 24 is formed in the programmable logic IC 31*a* in which, the logic circuits of the IC are connected according to the program set Pa. The IF circuit section 45*a* analyzes the input signal and can determine whether or not operation is instructed and whether or not the received operation is predetermined operation (for example, operation for selecting a station) if the operation is instructed. Moreover, when the predetermined operation is received, the IF circuit section 45*a* generates operating data corresponding to the operation and instructs the guarantee type MAC layer processing circuit 42*a* to transmit the operating data. Accompanying this, logic circuits included in the MAC layer processing circuit 42*a* include logic circuits for generating a data stream of the MAC protocol, for example, by adding, to the operating data, data for transmission according to a predetermined MAC protocol (for this example, IEEE 802.11e) and for transmitting the data stream to the wireless communication IC 12 via the IF circuit section 41*a*.

This makes it possible for the programmable logic IC 31*a* controls the wireless communication IC 12 so as to make the wireless communication IC 12 transmit operating data that indicates the operation when the input device 24 receives operation concerning television broadcast.

In the same way, in the programmable logic IC 31*b* in which logic circuits of the IC are connected according to the program set Pb, the IF circuit section 46*b* that transmits the input signal received from the input device 24 to the application processing section 44*b* is formed. The logic circuits included in the application processing section 44*b* include logic circuits for identifying operation received by the input device 24 based on the input signal, at the same time generating a data stream of the protocol for the remote desktop system, to the data stream being used for informing the operation to the computer 3, and transmitting the data stream to the TCP/IP processing section 43*b*.

Logic circuits constituting in the TCP/IP processing section 43*b* include not only logic circuits for converting a data stream of the IP protocol into the protocol for the remote desktop system but also, for example, logic circuits for converting a data stream of the protocol for the remote desktop system to a data stream of the IP protocol by adding a header for communicating by the TCP/IP protocol to the data stream of the protocol for the remote desktop system and the like and at the same time transmitting the data stream to the best effort type MAC layer processing circuit 42*b*.

Moreover, logic circuits constituting the MAC layer processing circuit 42*b* include, for example, logic circuits for generating a data stream of the MAC protocol by adding data for transmission according to a predetermined MAC protocol (for this example, IEEE 802.11) to operating data and the like and for transmitting the data stream to the wireless communication IC 12 via the IF circuit section 41*a*.

This allows the programmable logic IC 31*b* to control the wireless communication IC 12 and make the wireless communication IC 12 transmit operation data that indicates the operation when the input device 24 receives operation to the monitor image.

In the programmable logic IC 31*b* in which the logic circuits of the IC are connected according to the program set Pb, an ARP (Address Resolution Protocol) processing section 47*b* for carrying out ARP processing is formed. The ARP processing section 47*b* analyzes the data stream supplied from the TCP/IP processing section 43*b* and identifies an IP address of a destination. At the same time, the ARP processing section 47*b* identifies a MAC address corresponding to the IP address and instructs the MAC layer processing circuit 42*b* to transmit the data stream to the MAC address, in the following manner. Namely, the ARP processing section 47*b* instructs the MAC layer processing circuit 42*b* to transmit a data stream including the IP address to a MAC address predetermined as a broadcast address. According to this, when the MAC layer processing circuit 42*b* controls the wireless communication IC 12 and broadcasts the data stream, among devices that can communicate with the display terminal 4 a device whose IP address is the same as the IP address included in the data stream sends data including the MAC address of the device in reply. When the data stream is restored by the MAC layer circuit 42*b* and the ARP processing section 47*b* receives the data stream, the ARP processing section 47*b* extracts the MAC address from the data stream and gives an instruction so that the data stream received from the TCP/IP processing section 43*b* is sent to the MAC address. This allows the display terminal 4 to successfully communicate by the TCP/IP protocol, even when the MAC address corresponding to the IP address of the destination of the data stream received by the TCP/IP processing section 43*b* is unknown.

Here the ARP processing section 47*b* may carry out the processing every time the TCP/IP processing section 43*b* sends a data stream. However, the ARP processing section 47*b* in this embodiment stores, in a memory that is not illustrated in FIGS, information on the relationship between a MAC address and an IP address corresponding to the MAC address. When the IP address of the destination is supplied from the TCP/IP processing section 43*b* and the MAC address corresponding to the IP address is stored in the memory, the process mentioned above is skipped and the ARP processing section 47*b* is able to give an instruction to send the data stream, which is supplied from the TCP/IP processing section 43*b*, to the MAC address read out from the memory.

The ARP processing section 47*b* determines whether or not a data stream restored by the MAC layer processing circuit 42*b* is an inquiry of a MAC address corresponding to an IP address. When the data stream is an inquiry, the ARP processing section 47*b* gives an instruction to the MAC layer processing circuit 42*b* so as to cause the MAC layer processing circuit 42*b* to send, to the a source of the inquiry, a data stream including the MAC address stored in the memory beforehand as the MAC address of the device to which the ARP processing section 47*b* belongs.

Moreover, the IF circuit sections 45*a* and 46*b* can determine whether an instruction for changing a kind of screen image (television images or the monitor image) that the display terminal 4 displays is received or not, based on the input signal from the input device 24. Further, when each of the IF circuit sections 45*a* and 46*b* receive an instruction for displaying a kind of image other than the kind displayed for the present, each of the IF circuit sections 45*a* and 46*b* instructs a controller circuit of the programmable logic IC 31 (not illustrated in FIGS.) to read out, from the ROM 32, a program set for displaying the kind of image, and to connect the logic circuits of the programmable logic IC 31 according to the program set at the same time. This makes the connection of the logic circuits in the programmable logic IC 31 change from the present state to a state for displaying an instructed kind of image.

For example, when television images are displayed, the IF circuit section 45a is formed in the programmable logic IC 31a. When the input device 24 of the display terminal 4 receives an instruction for displaying the monitor image, the IF circuit section 45a instructs the controller circuit to read out the program set Pb corresponding to the monitor image. This changes connection of the logic circuits in the programmable logic IC 31 from the state of the programmable logic IC 31a to the state of the programmable logic IC 31b and allows the display terminal 4 to display the monitor image.

In this embodiment, the wireless communication IC 12 and the programmable logic IC 31 are connected by a bus, for example, a PCI (Peripheral Component Interconnect) bus, an ISA (Industry Standard Architecture) bus, or an independent bus and the like, and the IF circuit sections from 41a to 41c (partially explained later) include a circuit for controlling a bus. The driving circuits 22 and 23 of the display 13 in the present embodiment are driven by LDVS (Low Voltage Differential Signaling). Accompanying this, among the logic circuits included in the programmable logic IC 31, at least the logic circuits connected to the display 13 are arranged in such a manner as to allow the circuit to output an LDVS signal. The driver controller circuits 44a, 45b, and 43c (partially explained later) output a controller signal and a video signal to both the driving circuits 22 and 23, as an LDVS signal.

The display terminal 4 in this embodiment is arranged so that the display terminal 4 can display not only a video signal received by the wireless communication IC 12 but also a video signal obtained by other interface circuits.

To be more specific, the display terminal 4 in this embodiment, as illustrated in FIG. 4, includes, as another interface circuit, an interface IC 16 (IC for interface) for interfacing with a memory card 15 as an accumulative recording medium. The IF IC 16 (interface IC) is connected to the programmable logic IC 31 as well as the wireless communication IC 12 and the programmable logic IC 31 can control the display 13 so that an image obtained by the IF IC 16 is displayed instead of the video signal from the wireless communication IC 12. Examples of the memory card 15 are a Compact Flash (Registered Trademark), a Smart Media (Registered Trademark), a Memory Stick (Registered Trademark) and the like.

In the ROM 32 of a controller section 14, not only the program sets Pa and Pb but also a program set Pc that is used when an image indicated by video data stored in the memory card 15 is displayed.

When the screen image in the memory card 15 is displayed on the display 13, the programmable logic IC 31 connects the logic circuits of the IC according to the program set Pc. This results in forming each block from 41c to 44c in the programmable logic IC 31 illustrated in FIG. 1 and allows the programmable logic IC 31 to operate as a programmable logic IC 31c.

To be more specific, in the memory card 15, video data of a predetermined image format is stored. A JPEG (Joint Photographic Experts Group) format is one example of the image format.

On the other hand, the programmable logic IC 31c includes an IF circuit section 41c, a decoder circuit 42c, and a driver controller circuit 43c. The IF circuit section 41c controls the IF IC 16 so as to read out video data of the image format from the memory card 15. The decoder circuit 42c analyzes (decodes), as a signal stream according to the image format, the video data read out from the memory card 15 via the IF IC 16 and the IF circuit section 41c. The driver controller circuit 43c controls operation of the data signal line driving circuit 22 and the scanning signal line driving circuit 23 in the display 13 and transmits video data stored in the RAM 33 to the data signal line driving circuit 22.

This allows the programmable logic IC 31 (31c) to control both the driving circuits 22 and 23 in the display 13 so that the image stored in the memory card 15 is displayed.

In the programmable logic IC 31, the IF circuit section 44c that receives the input signal from the input device 24 of the display 13 is formed. The IF circuit section 44c analyzes the input signal and can determine whether or not operation is instructed and whether the received operation is a predetermined operation or not, when the operation is instructed. Further, the IF circuit section 44c instructs other blocks from 41c to 43c in the programmable logic IC 31c or an external circuit connected to the programmable logic IC 31c to perform processing corresponding to the operation, when the predetermined operation is received.

For example, the IF circuit section 44c in this embodiment can receive operation for changing an image displayed, as the predetermined operation. When the operation is received, the IF circuit 44c instructs the IF circuit section 41c to control the IF IC 16. This allows the IF IC 16 to read out indicated video data from the memory card 15. As the result, the display terminal 4 can change the image being currently displayed, according to the operation.

In a similar manner as the IF circuit sections 45a and 46b, the IF circuit section 44c can change connection of the logic circuits in the programmable logic IC 31 by giving an instruction to the controller circuit (not illustrated in FIGS.) of the programmable logic IC 31, when the instruction for displaying a kind of an image other than the currently-displayed image is received.

By the configuration mentioned above, during the time in which the input device 24 of the display terminal 4 is not receiving an instruction for changing a kind of a screen image displayed from a user (NO in S1 in FIG. 5), the programmable logic IC 31 of the display terminal 4 connects the logic circuits of the IC according to the program set for displaying/operating the kind of the currently displayed image among kinds of images the programmable logic IC 31 can display; the program set is chosen out of program sets (Pa-Pc) stored in the ROM 32.

At this state, as illustrated in FIG. 1, among a block group (41a-45a), a block group (41b-47b), and a block group (41c-44c) which are able to be formed in the programmable logic IC 31, only a block group according to the current program set is formed in the programmable logic IC 31.

In S2, the block group controls the display 13 so as to cause the display 13 to display an image instructed by a signal from the wireless communication IC 12 or the IF IC 16. At this state, the block group controls the wireless communication IC 12 or the IF IC 16 according to the input signal from the input device 24. For example, FIG. 1 illustrates the case in which television images from the receiver body 2 are displayed and the block group 41a-45a is formed.

This allows the display terminal 4 to display the television images from the receiver body 2, the monitor image from the computer 3, or the image from the memory card 15. Also the display terminal 4 can receive operation for selecting a station, operation for manipulating the monitor image or operation for changing the image, send operating data that indicates operation to the receiver body 2 or the computer 3, and read out the video data corresponding to operation from the memory card 15 and display the image corresponding to the video data.

At the state mentioned above, when the input device 24 of the display terminal 4 receives an instruction for changing a kind of a displayed image from a user (YES in S1), the programmable logic IC 31 in S3 reads out, from the ROM 32, a program set for displaying a kind of image, and changes connection of the logic circuits of the programmable logic IC 31. This results in, for example, as illustrated in FIG. 6, forming, in the programmable logic IC 31, a block group (41b-47b) for displaying the monitor image.

In this way, in the display terminal 4 in this embodiment, the program sets Pa-Pc are stored. In the program sets Pa-Pc, a series of operation, up to the time an video data that is read from an accumulative recording medium (the memory card 15) or a receiver section for communication (the wireless communication IC 12) and converted into a logic signal is sent forward to the display 13, is described respectively. The programmable logic IC 31 changes operation by reading one of these program sets Pa-Pc.

Accordingly, among the block group (41a-45a), the block group (41b-47b) and the block group (41c-44c) that are able to be formed in the programmable logic IC 31, only a block group necessary for displaying the kind of the currently-displayed image is formed in the programmable logic IC 31. Other block groups are not formed until another kind of the image is displayed. When the kind of the image displayed is changed, the block group formed in the programmable logic IC 31 is changed. As the result, different from the configuration in which ICs for displaying different kinds of images that the display terminal 4 is able to display are provided respectively, a main processing section can be made up of one IC chip. This makes it possible to reduce in size an I/O section and a wiring section for connecting ICs when plural ICs are connected. Accordingly, a printed wiring board can be reduced in size and the number of layers of the printed board can be drastically reduced. As the result, compared with a configuration in which ICs for displaying respective kinds of images are provided, circuit scale, power consumption, size, weight, and cost of the display terminal 4 are drastically reduced.

Because the operation mentioned above in the display terminal 4 is carried out by the programmable logic IC 31, compared with the following configuration, namely a configuration in which a general-purpose high-speed CPU and a main storage device is included and the operation is carried out by making the CPU repeat processing, circuit scale, power consumption, size, weight, and further cost can be drastically reduced likewise.

Because in the display terminal 4 the programmable logic IC 31 carries out the operation mentioned above, the display terminal 4 is flexible about a specification change even after the display terminal 4 has been designed once. For example, a function can be easily added by programming a programmable logic circuits of the programmable logic IC 31 using the circuit program, on condition that the scale of the programmable logic IC is not changed from the original scale and it is unnecessary to change the positions of I/O pins in order to realize the operation.

Here, in the display terminal 4 of this embodiment, not only the television images and the image of the memory card 15 but also the monitor image of the computer can be displayed. Even so, the aforesaid operation is limited to (i) operation for controlling the display 13 to display image indicated by a signal from the wireless communication IC 12 or the IF IC 16, and (ii) operation for controlling the wireless communication IC 12 to transmit operating data that indicates operation received by the input device 24, based on the input signal from the input device 24, or (I) operation for changing an image read out by the IF IC 16 according to operation received by the input device 24 and based on the input signal from the input device 24, and (II) operation for changing operation of the programmable logic IC 31 according to the operation received by the input device 24.

Accordingly, different from a configuration in which control is performed by an sequential controlling procedure as the CPU mentioned above, namely a configuration in which operation that: commands are stored in a storage device; the commands are read out from there one by one and carried out; and the result is returned, is repeated, each operation mentioned above can be carried out, without any troubles, by using the programmable logic IC 31 in which logic circuits corresponding to respective successive states of a flow chart in a program exist at the same time. Moreover, the programmable logic IC 31, different from a system in which a CPU is set, does not include a section where processing concentrates because central processing is not performed in the programmable logic IC 31. Also, a command and data are transmitted through different transmission channels, and unlike a CPU, there is no a common bus for transmitting both the command and data. Thus, compared with the case in which processing is carried out by a CPU, operational frequency of a whole circuit can be drastically reduced.

To explain more in details, because the logic circuits concerning successive states are exclusive processing circuits, a desired calculation result can be obtained even if a command can be carried out with low clock frequency. Moreover, because there are less bottleneck parts where processing concentrates, it is unnecessary to increase clock frequency of the bottleneck parts. Accordingly, power consumption can be reduced. Further, because it is not necessary to generate/process a program during a processing operation, power consumption for generating/processing the program can be eliminated.

Because various types of control (program control, DMA control, and channel control) for imparting versatility and extensibility and control of various types of peripheral devices are not necessary, power consumption and circuit scale for carrying out the control can be reduced.

As the result, processing that is carried out by software can be carried out by hardware having low power consumption, and various kinds of processing carried out by software can be easily performed by one chip, i.e. the programmable logic IC 31. For example, whereas processing by a CPU consumes 12 [W], processing by the programmable logic IC 31 consumes only less than 1 [W].

Figure 7:
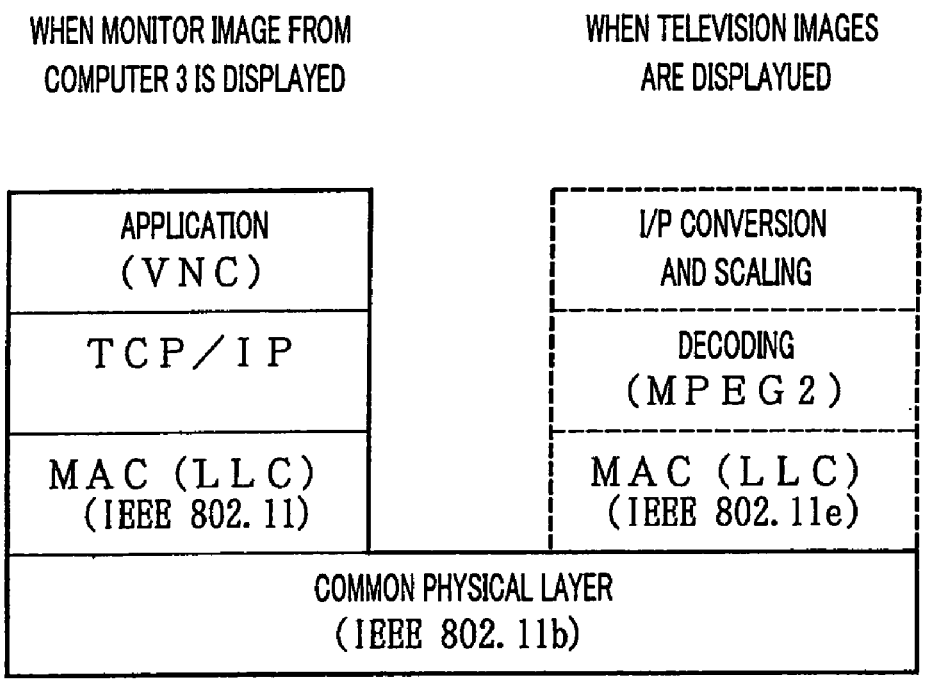
FIG. 7 is a drawing of a layer structure of the programmable logic IC mentioned above.

As illustrated in FIG. 7, the programmable logic IC 31a-31c does not run an OS (Operating System). For example, when the television images are displayed (illustrated by a dotted line in FIG. 7), on a MAC (LLC) layer, a layer for decoding and a layer for interlace/progressive conversion and scaling are formed. The layer for decoding receives a data stream, which is transmitted by a MAC protocol, from the MAC (LLC) layer, without using an OS. In the same manner, when the monitor image from the computer 3 is displayed (illustrated by a solid line in the FIG. 7), an application layer (a VNC layer) is formed above the TCP/IP layer. The application layer passes a data stream, which is transmitted to a destination, to the TCP/IP layer and at the same time receives a data stream, which is transmitted by a TCP protocol (a data stream of the protocol for the remote desktop system), from the TPC/IP layer, without using an OS. The MAC (LLC) layer is realized by the MAC layer processing circuits 42a and 42b. The layer for decoding and the layer for interlace/progressive conversion and scaling are realized by the decoder circuit 43a. Moreover, the TCP/IP layer and the application layer are realized by the TCP/IP processing section 43*b* and the application processing section 44*b* respectively.

In this way, because each layer mentioned above does not use the OS for communication, a series of operation up to the time of sending video data after converted into a logic signal to the display 13 can be simplified. As the result, circuit scale of the programmable logic IC 31 can be drastically reduced although the operation is carried out by the programmable logic IC 31.

Generally, operation timing of both the driving circuits often differs in each combination of a pixel array and a format of video data inputted to a display. Accordingly, in the display, a timing controller for controlling operation timing of both the driving circuits is often a chip separate from a pixel array. As the result, when a circuit for operating as a timing controller is provided in the display, the number of elements included in the display increases and a configuration of the display tends to become complex.

On the other hand, in the display terminal 4 of this embodiment, a timing controller is not provided in the display 13 and the programmable logic IC 31 directly controls the data signal line driving circuit 22 and the scanning signal line driving circuit 23 in the display 13 (terminals of the programmable logic IC 31 are connected to terminals of both the driving circuits 22 and 23). As the result, compared with a configuration in which the timing controller is provided in the display 13 and the programmable logic IC 31 communicates with the timing controller, the configuration of the display 13 can be simplified.

The programmable logic IC 31 can change operation by changing a program set to be read. Accordingly, even when a combination of the pixel array and the format of the video data inputted into the display changes, operation timing of both the driving circuits 22 and 23 can be made suitable for the combination only by selecting a program set corresponding to the combination. This makes it possible to use the same programmable logic IC 31 as hardware and, thus, different from a configuration in which a circuit that operates as a timing controller of the display 13 is provided, it is unnecessary to provide the circuit as a separate chip. Therefore, compared with the case that the circuit is provided as a separate chip, the number of terminals, interface circuits, or wires for connecting the chip to outside can be reduced. As the result, compared with a configuration in which a timing controller is provided in the display 13, the circuit configuration of the whole display terminal 4 can be simplified.

In the example explained above, the wireless communication IC 12 is shared between (i) the case in which communication is carried out by the guarantee type MAC protocol and (ii) the case in which communication is carried out by the best effort type MAC protocol, and either the guarantee type MAC layer processing circuit 42*a* or the best effort type MAC layer processing circuit 42*b* is formed in the programmable logic IC 31. However, an embodiment of the present invention is not limited to this.

For example, when the wireless communication IC 12 is capable of performing processing by both the guarantee type and the best effort type MAC protocols, it is possible to cause IF circuit sections 41*a* and 41*b* to control the wireless communication IC 12 to transmit a data stream by the respective MAC protocols, without forming the MAC layer processing circuits 42*a* and 42*b* in the programmable logic IC 31. Also, for each situation (In this embodiment, whether to display television images or the monitor image), the wireless communication ICs 12 that operate as physical layers (according to necessity, MAC layers are included) may be separately provided and the IF circuit sections 41*a* and 41*b* of the programmable logic IC 31 may communicate with one of the wireless communication ICs 12.

Regardless of the formation of the MAC layer processing circuits 42*a* and 42*b* in the programmable logic IC 31 and regardless of the number of the wireless communication IC 12 (i.e. whether the number is single or not), substantially the same effect is attained by a configuration in which a connection of the logic circuits of the programmable logic IC 31 set between the wireless communication IC 12 and the display 13 can be changed by reading a program set among the program sets (Pa, etc.).

However, when the wireless communication IC 12 is single and the MAC layer processing circuits (42*a*, etc.) are formed in the programmable logic IC 31 as in this embodiment, compared with a configuration in which the wireless communication ICs 12 are plural or a configuration in which the wireless communication IC 12 processes plural MAC protocols, circuit scale, power consumption, size and weight of the display terminal 4 can be reduced.

The example above has been described on the assumption that the display terminal 4 is portable. However, an embodiment is not limited to this case. The display terminal 4 may be a stationary terminal that communicates with the receiver body 2 or the computer 3 via a wired transmission channel.

Even in this case, by a configuration in which a connection of the logic circuits of the programmable logic IC 31 is changed according to which one of the program sets (Pa, etc.) is read, circuit scale, power consumption, size and weight of the display terminal 4 can be reduced.

For the portable display terminal 4 driven by a battery, reduction in power consumption directly leads to extension of operation hours. Moreover, when the display terminal 4 is carried around, size and weight are desired to be as small as possible. Accordingly, the exemplary embodiment can be preferably used especially for the portable display terminal 4.

In the exemplary embodiment, the case in which plural program sets are stored beforehand in the ROM 32 is explained as an example, but an embodiment is not limited to this. When a program set is stored in a storage device accessible from the programmable logic IC 31 before the programmable logic IC 31 changes a program set to be read, substantially the same effect can be attained by a configuration in which the storage device is set instead of/in addition to the ROM 32.

In this case, the program set is written into the storage device by a device that is capable of writing into the storage device, for example, by storing the program set in a recording medium and distributing the recording medium or by distributing the program set using a communication section for transmission via a wired or wireless communication channel. The recording medium may be used as the storage device. In any of the cases, substantially the same effect is attained because the programmable logic IC 31 that accesses the storage device can operate substantially in the same way as mentioned above when the program set is stored in the storage device.

A format for storing a program in the recording medium for distribution may be, for example, readable by the programmable logic IC 31, or may be a source code or an intermediary code generated on the way of interpreting or compiling. In any of the cases, if the programmable logic IC 31 is able to be converted into a programmable format by processing such as decompression of compressed information, decryption of encoded information, interpreting, compiling and the like, or a combination of any of these processes, the same effect can be attained regardless of the format with which the program is recorded into the recording medium.

As mentioned above, an image-display-device controller circuit (for example, a controller section 14) according to the present invention is characterized by including a programmable logic circuit (for example, a programmable logic IC 31), which is connected between (a) an interface circuit (for example, an wireless communication IC 12 or an IF IC 16 and the like) for inputting data indicating content to be displayed on an image display device (for example, a display 13) and (b) the image display device, for controlling the image display device to display an image that corresponds to the data from the interface circuit and a storage device (for example, a ROM32) that stores plural program sets each of which describing a series of processes from (i) receiving data from the interface circuit to (ii) outputting a controlling signal for controlling the image display device, for programming the programmable logic circuit. The programmable logic circuit (A) reads one of the plural program sets stored in said storage device and operates in accordance with the one of the plural program sets, and (B) when operation described in another one of the plural program sets becomes necessary, reads the another one of the plural program sets from the storage device and operates in accordance with the another one of the plural program sets, so as to change its operation.

In the configuration mentioned above, the programmable logic circuit programmed by one of the plural program sets carries out the series of processes from (i) receiving data from the interface circuit to (ii) outputting a controlling signal for controlling the image display device.

In this state, for example, when operation described in another one of plural program sets becomes necessary in order (i) to display a different kind of content from content that the image display device is displaying, (ii) to display content according to a different protocol from a protocol according to which the image display device is displaying content, and (iii) to display content according to a different kind of application from a kind of application according to which the image display device is displaying content or the like, said programmable logic circuit reads, from said storage device, that one of the plural program sets. This changes operation of the programmable logic circuit.

In the configuration above, by changing the program set for programming the programmable logic circuit according to circumstances, operation of the programmable logic circuit is changed. Therefore, different from a configuration in which a necessary circuit for each circumstance is separately provided, the programmable logic circuit is shared as a circuit necessary for each circumstance. As the result, circuit scale, power consumption, size and weight can be drastically reduced, compared with the configuration in which circuits are provided separately for each circumstance.

Moreover each operation mentioned above is carried out by the programmable logic circuit (a circuit that can change connection between logic circuits by rewriting the program). Therefore, compared with a configuration in which the above operation is carried out by including a general-purpose high-speed CPU and a main storage device and making the CPU repeat processing, circuit scale, power consumption, size and weight can be drastically reduced.

Because the above operation is a series of operation from (i) receiving data from the interface circuit to (ii) outputting a controlling signal for controlling the image display device, the operation can be carried out, without any troubles, by the programmable logic circuit.

In addition to the configuration mentioned above, the image display device is capable of displaying plural kinds of content. The plural program sets correspond to said plural kinds of content, respectively. For causing the image display device to display a different kind of content from content that the image display device is displaying, said programmable logic circuit reads, from said storage device, that one of the plural program sets which corresponds to the different kind of content.

Further, at least one of the plural kinds of content may be television images. At least one of the plural kinds of content may be a monitor image from a computer that communicates with the interface circuit.

In the configuration mentioned above, the plural program sets correspond to each kind of the content respectively and, for causing the image display device to display a different kind of content from content that the image display device is displaying, said programmable logic circuit reads, from said storage device, that one of the plural program sets which corresponds to the different kind of content. As the result, when the image display device that is capable of displaying plural kinds of the content by switching to a different kind from a kind that is being displayed is controlled, the program set that programs the programmable logic circuit can be changed according to the different kind of content from content that the image display device is displaying.

Television images and a monitor image of a computer and the like are examples of kinds of the content. The stored program sets corresponding to each of the content are changed.

This makes it possible to drastically reduce circuit scale, power consumption, size and weight of the controller circuit in the image display device that is capable of displaying plural kinds of the content.

On the other hand, in addition to the configuration mentioned above, the image display device is capable of displaying content transmitted by one of plural kinds of protocols, the protocols transmitting content to be displayed by the image display device. The plural program sets correspond to the plural kinds of protocols, respectively. For causing the image display device to display content according to a different protocol among the protocols, from a protocol according to which the image display device is displaying content, the programmable logic circuit reads, from the storage device, that one of the plural program sets which corresponds to the different protocol.

By the configuration mentioned above, according to the different protocol, among the protocols, from a protocol according to which the image display device is displaying content, the program set that programs the programmable logic circuit is changed. Accordingly, circuit scale, power consumption, size and weight of the controller circuit in the image display device that is capable of displaying content transmitted by one of plural kinds of the protocols can be drastically reduced.

In addition to the configuration mentioned above, the image display device is capable of displaying content processed by one of plural kinds of applications. The plural program sets correspond to the plural kinds of applications, respectively. For causing the image display device to display content according to a different kind of application, among the applications, from a kind of application according to which the image display device is displaying content, the programmable logic circuit reads, from the storage device, that one of the plural program sets which corresponds to the different kind of application.

In this configuration, according to a different kind of application, among the applications, from a kind of application according to which the image display device is displaying content, the program set for programming the programmable logic circuit is changed. Accordingly, circuit scale, power consumption, size and weight of the controller circuit in the image display device that is capable of displaying content processed by one of plural kinds of the application can be drastically reduced.

Further, in addition to the configuration mentioned above, the programmable logic circuit programmed by one of the plural program sets controls operation timing of driving circuits (for example, a data signal line driving circuit 22 and a scanning signal line driving circuit 23) that drive a scanning signal line and a data signal line of said image display device.

Here, operation timing of driving circuits often differs for every combination of pixel array of the image display device and video data inputted into the image display device. Accordingly, in the image display device, a timing controller that controls operation timing of the driving circuits that drive the scanning signal line and the data signal line often a chip separate from a pixel array. As the result, when a circuit that operates as a timing controller is provided in the image display device, number of elements included in the image display device increases and a configuration of the image display device tends to be complex.

On the contrary, in the configuration explained above, the programmable logic circuit controls operation timing of the driving circuits that drive the scanning signal line and the data signal line in the image display device. As the result, compared with the configuration in which the timing controller is provided in the image display device and the programmable logic circuit communicates with the timing controller, the configuration of the image display device can be simplified.

The programmable logic circuit can change operation timing by changing the program set to be read. Accordingly, even when operation timing of the driving circuits differ in each combination of a pixel array of the image display device and the video data inputted to the image display device, it is possible to use the same programmable logic as hardware only by selecting the program set corresponding to the combination. Because of this, it becomes unnecessary to provide a separate chip, different from a configuration in which a circuit that operates as a timing controller is provided in the image display device. Thus, terminals for connecting the chip to outside, interface circuits, or wires can be reduced.

As the result of these, compared with the configuration in which a timing controller is provided in the image display device, circuit arrangement of the image display device and the whole controller circuit for the image display device can be simplified.

In addition to the configuration mentioned above, the programmable logic circuit programmed by one of the plural program sets may control said interface circuit, based on an input signal from receiving means that receives operation by a user of said image display device.

In the configuration, the programmable logic circuit programmed by the program set controls the interface circuit, based on the input signal from the receiving section that receives operation from a user of the image display device, for example, by controlling a wireless communication circuit as an interface circuit to transmit operation data, which corresponds to operation indicated by the input signal, to a source of content or by controlling an interface circuit connected to a recording medium to change video data to be read out of the recording medium according to the input signal. As the result, the programmable logic circuit can make the interface circuit carry out process that corresponds to operation of a user. Accordingly, compared with the configuration in which a circuit for making the interface circuit carry out process that corresponds to operation of a user is separately provided, circuit scale, power consumption, size and weight of the controller circuit in the image display device can be reduced.

In addition to the configuration mentioned above, the interface circuit may be a wireless communication circuit. In the configuration, for example, it is unnecessary to connect a receiver body for television images, which transmits an image of the television broadcast to the wireless communication circuit, or a computer, which transmits a monitor image of the computer to the wireless communication circuit, with the image-display-device controller circuit by wiring. Accordingly, the image-display-device controller circuit can be preferably used for controlling a portable image display device.

In addition to the configuration mentioned above, the interface circuit may read out video data stored in a recording medium (for example, a memory card 15). By this configuration, because the interface circuit is a circuit that reads out video data recorded in the recording medium, the image-display-device controller circuit can make the image display device display an image indicated by the video data recorded in the recording medium.

On the other hand, a display device (for example, a display terminal 4) of the present invention is characterized by including an image display device and a controller circuit of the image display device for controlling the image display device. The controller circuit has one of the configurations mentioned above.

Here, although the controller circuit can change a series of operation from (i) receiving data from the interface circuit to (ii) outputting a controlling signal for controlling the image display device by changing the program set that programs the programmable logic circuit, circuit scale, power consumption, size and weight of the image-display-device controller circuit are small. Accordingly, using the image-display-device controller circuit, it is possible to attain a display device which is small in circuit scale, power consumption, size and weight and which, further, can change the series of operation mentioned above. The image display device can be preferably used, for example, as a display device, which can display by switching from display of television images to a monitor image of a computer and vice versa, and the like.

In addition to the configuration mentioned above, the image display device is capable of displaying plural kinds of content. The plural program sets correspond to plural kinds of content, respectively. For causing the image display device to display a different kind of content from content that the image display device is displaying, the programmable logic circuit reads, from the storage device, that one of the plural program sets which corresponds to the different kind of content. The interface circuit is a wireless communication circuit. At least one of the plural kinds of content is television images supplied from a television broadcast receiver body connected via the wireless communication circuit. At least one of the plural kinds of the content is a monitor image from a computer connected via the wireless communication circuit.

By the configuration, even when the computer and the television broadcast receiver body are not connected by wiring, it is possible to display by switching from display of television images from the receiver body to a monitor image of a computer from the computer and vice versa. Further, a display device that is small in circuit scale, power consumption, size and weight can be attained. Accordingly, the display device is preferably used for, for example, a portable display device and the like.

As mentioned above, according to the present invention, a program for a programmable logic circuit, the program being connected between (a) an image display device capable of displaying content and (b) an interface circuit for inputting data indicating content to be displayed on an image display device, for controlling the program image display device to display an image that corresponds to the data from said interface circuit, the program includes: plural program sets in each of which a series of processes from (i) receiving data from said interface circuit to (ii) outputting a controlling signal for controlling said image display device is described, for programming said programmable logic circuit; and a program causing said programmable logic circuit to read, from a storage device another one of the plural program sets being different from currently-used one of the plural program sets, when operation described in another one of the plural program sets becomes necessary. In a recording medium of the present invention, the program is recorded.

When these programs are read into the programmable logic circuit, a device including the programmable logic circuit operates as an image-display-device controller circuit. Accordingly, in the same manner as the image-display-device controller circuit mentioned above, an image-display-device controller circuit which is small in circuit scale, power consumption, size and weight can be attained, although the image-display-device controller circuit is capable of changing a series of operation from (i) receiving data from the interface circuit to (ii) outputting a controlling signal for controlling the image display device by changing the program set that programs the programmable logic circuit.

As mentioned above, according to the present invention, an image-display-device controller circuit, which is small in circuit scale, power consumption, size and weight, can be attained although the image-display-device controller circuit can change the series of operation from (i) receiving data from the interface circuit to (ii) outputting a controlling signal for controlling the image display device by changing the program set that programs the programmable logic circuit. Accordingly, the controller circuit can be used as a controller circuit for various kinds of image display devices including a portable image display device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image-display-device controller circuit comprising:
   a programmable logic circuit, which is connected between (a) an interface circuit for inputting data indicating content to be displayed on an image display device and (b) said image display device, for controlling said image display device to display an image that corresponds to the data from said interface circuit; and
   a storage device that stores plural program sets each of which describing a series of processes from (i) receiving data from said interface circuit to (ii) outputting a controlling signal for controlling said image display device, for programming said programmable logic circuit,
   wherein:
   said programmable logic circuit (A) reads one of the plural program sets stored in said storage device and operates in accordance with the one of the plural program sets, and (B) when operation described in another one of the plural program sets becomes necessary, reads said another one of the plural program sets from said storage device and operates in accordance with the another one of the plural program sets, so as to change its operation.

2. The controller circuit as in claim 1, wherein:
   said image display device is capable of displaying plural kinds of content;
   said plural program sets correspond to said plural kinds of content, respectively; and
   for causing the image display device to display a different kind of content from content that the image display device is displaying, said programmable logic circuit reads, from said storage device, that one of the plural program sets which corresponds to the different kind of content.

3. The controller circuit as in claim 2, wherein:
   at least one of said plural kinds of content is television images.

4. The controller circuit as in claim 2, wherein:
   at least one of said plural kinds of content is a monitor image from a computer that communicates with said interface circuit.

5. The controller circuit as in claim 1, wherein:
   said image display device is capable of displaying content transmitted by one of plural kinds of protocols, the protocols for transmitting content to be displayed by the image display device;
   said plural program sets correspond to said plural kinds of protocols, respectively; and
   for causing the image display device to display content according to a different protocol, among said protocols, from a protocol according to which the image display device is displaying content, said programmable logic circuit reads, from said storage device, that one of the plural program sets which corresponds to the different protocol.

6. The controller circuit as in claim 1, wherein:
   said image display device is capable of displaying content processed by one of plural kinds of applications;
   said plural program sets correspond to said plural kinds of applications, respectively; and
   for causing the image display device to display content according to a different kind of application, among said applications, from a kind of application according to which the image display device is displaying content, said programmable logic circuit reads, from said storage device, that one of the plural program sets which corresponds to the different kind of application.

7. The controller circuit as in claim 1, wherein:
   said programmable logic circuit programmed by one of the plural program sets controls operation timing of driving circuits that drive a scanning signal line and a data signal line of said image display device.

8. The controller circuit as in claim 1, wherein:
   said programmable logic circuit programmed by one of the plural program sets controls said interface circuit, based on an input signal from receiving means that receives operation by a user of said image display device.

9. The controller circuit as in claim 1, wherein:
   said interface circuit is a wireless communication circuit.

10. Said controller circuit as in claim 1, wherein:
    said interface circuit reads out image data stored in a recording medium.

11. A display device including an image display device and a controller circuit of said image display device for controlling said image display device, wherein:
    said controller circuit of said image display device includes:
    a programmable logic circuit, which is connected between (a) an interface circuit for inputting data indicating content to be displayed on an image display device and (b)

said image display device, for controlling said image display device to display an image that corresponds to the data from said interface circuit; and a storage device that stores plural program sets each of which describing a series of processes from (i) receiving data from said interface circuit to (ii) outputting a controlling signal for controlling said image display device, for programming said programmable logic circuit, wherein:

said programmable logic circuit (A) reads one of the plural program sets stored in said storage device and operates in accordance with the one of the plural program sets, and (B) when operation described in another one of the plural program sets becomes necessary, reads said another one of the plural program sets from said storage device and operates in accordance with the another one of the plural program sets, so as to change its operation.

12. The display device as in claim 11, wherein:

said image display device is capable of displaying plural kinds of content;

said plural program sets correspond to plural kinds of content, respectively;

for causing the image display device to display a different kind of content from content that the image display device is displaying, said programmable logic circuit reads, from said storage device, that one of the plural program sets which corresponds to the different kind of content;

said interface circuit is a wireless communication circuit;

at least one of said plural kinds of content is television images supplied from a television broadcast receiver body connected via said wireless communication circuit; and at least one of the plural kinds of said content is a monitor image from a computer connected via said wireless communication circuit.

13. A program for causing programmable logic circuit controlling an image display device to operate, the programmable logic circuit being connected between (a) the image display device capable of displaying content and (b) an interface circuit for inputting image data indicating content to be displayed on an image display device, for controlling the image display device to display an image that corresponds to the data from said interface circuit, the programmable logic circuit being programmable by plural program sets in each of which a series of processes from (i) receiving data from said interface circuit to (ii) outputting a controlling signal for controlling said image display device is described, the program causing said programmable logic circuit to perform the steps of:

selecting one of the plural program sets, so as to program said programmable logic circuit; and reprogramming said programmable logic circuit by using another one of the plural program sets being different from currently-used one of the plural program sets, when operation described in another one of the plural program sets becomes necessary.

14. A computer readable medium storing a program causing a computer to execute the program for a programmable logic circuit, the programmable logic circuit being connected between (a) the image display device capable of displaying content and (b) an interface circuit for inputting image data indicating content to be displayed on an image display device, for controlling the image display device to display an image that corresponds to the data from said interface circuit, the programmable logic circuit being programmable by plural program sets in each of which a series of processes from (i) receiving data from said interface circuit to (ii) outputting a controlling signal for controlling said image display device is described, the program causing said programmable logic circuit to perform the steps of:

selecting one of the plural program sets, so as to program said programmable logic circuit; and reprogramming said programmable logic circuit by using another one of the plural program sets being different from currently-used one of the plural program sets, when operation described in another one of the plural program sets becomes necessary.

* * * * *